Oct. 13, 1925.

H. G. SLINGLUFF

GLASS DRAWING APPARATUS

Filed Feb. 26, 1923

1,556,726

2 Sheets-Sheet 2

INVENTOR
H. G. Slingluff
by
James C. Bradley

Patented Oct. 13, 1925.

1,556,726

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

GLASS-DRAWING APPARATUS.

Application filed February 26, 1923. Serial No. 621,183.

*To all whom it may concern:*

Be it known that I, HARRY G. SLINGLUFF, a citizen of the United States, and a resident of Mount Vernon, in the county of Knox and State of Ohio, have made a new and useful Invention in Improvements in Glass-Drawing Apparatus, of which the following is a specification.

Figure 1:
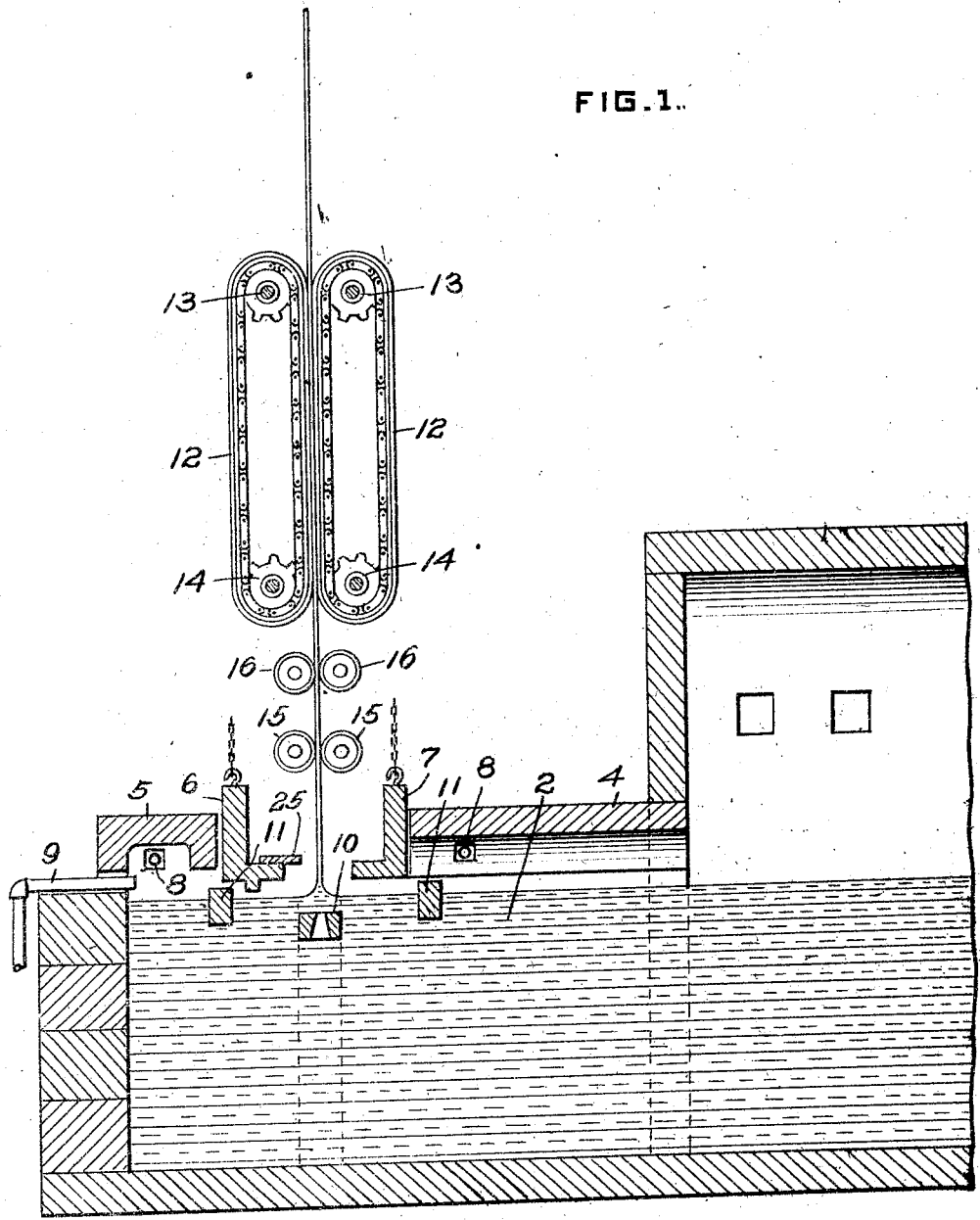
Figure 2:
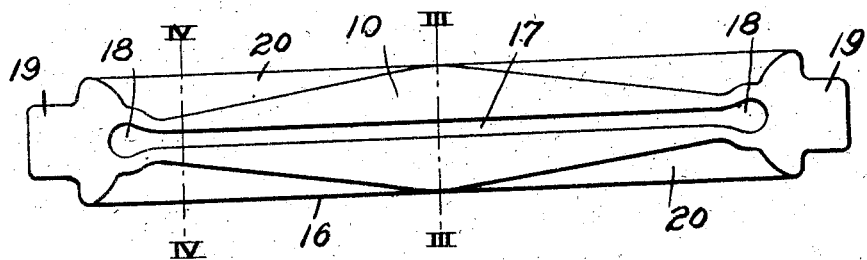
Figure 3:
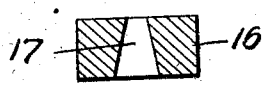
Figure 4:
Figure 5:
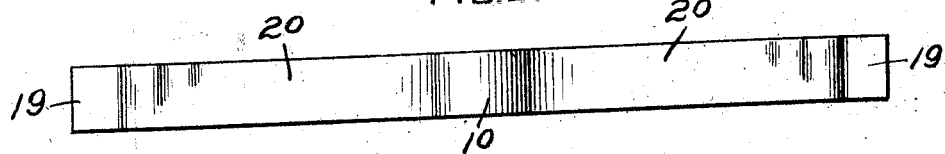
Figure 6:
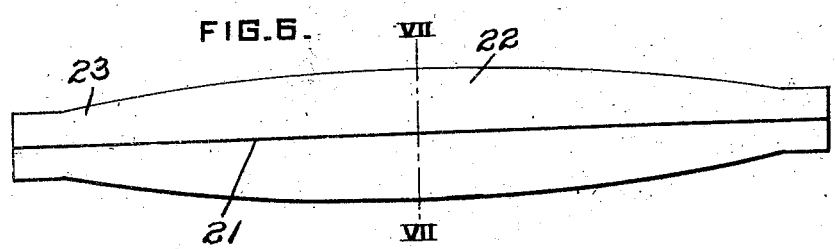
Figure 7:
Figure 8:

The invention relates to apparatus for drawing sheet glass from a tank and involves an improvement over the construction shown in my pending application, Serial No. 513,678, filed Nov. 8, 1921. The improvement relates primarily to the guiding bar located beneath the line of generation of the sheet and has for its principal objects the provision of a bar tending to produce a sheet of very uniform thickness from edge to edge and which is flat and free from warping and strain. The edge portions of the sheet being exposed to a greater extent to the chilling action of the atmosphere tend to draw thicker than the central portion which is exposed to a greater degree to the heat from the molten glass beneath. The guiding bar constituting the improvement of the present application tends to neutralize this condition. The result is accomplished by shaping the guiding bar as illustrated in the accompanying drawings wherein:

Figure 1 is a vertical section through the drawing tank and the drawing apparatus located thereabove. Fig. 2 is a plan view of the improved form of bar. Figs. 3 and 4 are sections on the lines III—III and IV—IV of Fig. 2. Fig. 5 is a side elevation of the bar of Fig. 2. Figs. 6 and 7 are views illustrating a modification, Fig. 6 being a plan view and Fig. 7 a transverse section on the line VII—VII of Fig. 6. Fig. 8 is a transverse section of another modified form of bar constructed similar to Fig. 6 but having a guiding slot instead of the guiding ridge of the Figs. 6 and 7 construction.

Referring to the drawings, 1 is the melting tank, which may be of any approved form and which is provided with the usual regenerative heating means, and 2 is the drawing tank. As indicated in Fig. 1, the drawing tank 2 is of considerable depth, so as to give a depth of glass, preferably ranging from 2 to 4 feet. The width of the tank depends upon the width of the sheet which it is desired to draw, such width being, for instance 6 feet, where the width of the sheet to be drawn is 5 feet.

The drawing tank is capped with the arch 4 at the end adjacent the melting tank and with the block 5 adjacent the rear end of the drawing tank. A pair of shielding members 6 and 7, L shaped in cross section are provided on opposite sides of the sheet. Suitable burners 8 and 9 are provided in order to prevent the body of glass in the drawing tank from becoming chilled below the proper drawing temperature. Skimming bars 11 are employed and intermediate these bars and between the shielding members 6 and 7 is located the guiding bar 10 to which the present improvement particularly relates.

The sheet may be drawn by any desired type of drawing mechanism, although the type illustrated in my Patent No. 1,364,895 is preferred, such type of apparatus being illustrated diagrammatically in Fig. 1 of the present application. This apparatus in its simplest form comprises a pair of endless belts 12 of asbestos carried by pulleys 13 and 14 driven by suitable mechanism, not shown. This belt apparatus prevents the glass from cooling too rapidly and after passing the upper pulleys 13, it is cut off by any suitable means. Asbestos rolls 15 and 16 may also be used intermediate the bath and the asbestos curtains in order to assist in holding the sheet straight, and such rolls may also be driven by means, not shown, in order to assist in drawing the sheet.

The construction of the guiding bar 10 is shown in detail in Figs. 2, 3 and 4. At the center the bar is rectangular in cross section and is provided with the vertical slot 17, decreasing in width from the lower side of the bar upward. At the ends of the bar this slot widens out as indicated at 18, such widened portion being designed to lie beneath the vertical edges of the sheet being drawn. The end portions 19 of the bar are fitted into suitable recesses in the side walls of the furnace and in use the bar is held submerged as indicated in Fig. 1, preferably with its upper face from 3 to 4 inches below the surface of the glass. From the central portion of the bar to the ends, the bar is beveled away or tapered as indicated at 20, thus giving a cross section at IV—IV as indicated in Fig. 4. At this point the bar is at its lower side substantially the same width as at the center, but at the top is only about one-half the width at the bottom. This configuration of bar has been found to give a sheet which is more uniform in thickness from the center to the edges than is the case where a bar is used which has the same cross section from end to end. With such a bar the tendency is to give edge portions in the sheet produced which are slightly thicker than the central portion. The relatively greater mass of the bar at the center than at the edges tends to give a slightly greater chilling effect to the central portions of the sheet and thus correct the tendency of the sheet to thin slightly at the center.

This result may be secured by modified types of bar construction, some of which are illustrated, although that of Figs. 2, 3 and 4 is preferred. Figs. 6 and 7 illustrate a form of bar in which the guide slot 17 of Fig. 2 construction is omitted and in place thereof, the ridge 21 is employed for keeping the line of generation of the sheet straight and in position over the center line of the bar. This bar is tapered in cross section from the central portion 22 to the end portions 23. In this form of construction, however, there is no tapering of the sides of the bar inward from the bottom up as is the case in the construction of Figs. 2, 3 and 4 as indicated at 20. The construction of Figs. 6 and 7 may be further modified by omitting the guide ridge 21 and substituting therefor the guide slot 24 as indicated in Fig. 8, Fig. 8 being designed to illustrate the cross section of a bar similar throughout to that of Figs. 5 and 6 except that the bar is slotted. In all of these types of bars the tendency is to maintain the sheet straight directly above the center line of the bar and to reduce the tendency of the sheet to draw thicker at the edge portions than in the center and the invention contemplates broadly the increasing of the chilling effect of the bar by varying its mass or arrangement of material from the edge portions to the central portion.

The horizontal flanges of the shields 6 and 7 serve as supports for refractory shade plates 25 of Fig. 1. These plates, when in use, as illustrated, serve to intensify the heat in the bath or on the base of the sheet lying below or opposite, since the heat from the bath is reflected back from the over hanging edges of the plates. When not in use, the plates are pushed back so that they do not project out past the vertical edges of the shields. In case the sheet of glass at its base becomes unduly thickened at a certain point in its width or develops any imperfection at such point which can be reduced by an increased temperature, the shade plate is moved out over or opposite such point, thus securing the desired increase in temperature. A number of plates may be used at different points at the same time, if desired.

What I claim is:

1. In combination in apparatus for drawing sheet glass, a glass drawing tank adapted to carry a bath of molten glass, at a particular level, means for drawing a sheet upward from the bath and a refractory bar in the bath and extending transversely across the tank below said level of the bath and the line of generation of the sheet, said bar having its upper portion of varying width, widest at the center portion and decreasing in width toward the end portion.

2. In combination in apparatus for drawing sheet glass, a glass drawing tank adapted to carry a bath of molten glass at a particular level, means for drawing a sheet upward from the bath and a refractory vertically slotted bar in the bath and extending transversely across the tank below said level of the bath and the line of generation of the sheet, said bar having its upper portion of varying width, widest at the center portion and decreasing in width toward the end portion.

3. In combination in apparatus for drawing sheet glass, a glass drawing tank adapted to carry a bath of molten glass at a particular level, means for drawing a sheet upward from the bath and a refractory bar in the bath and extending transversely across the tank below said level of the path and the line of generation of the sheet, said bar having its upper portion beveled away from the ends outward from the center in such manner that the upper face of the bar is of decreasing width from the center portion to the end portions.

4. In combination in apparatus for drawing sheet glass, a glass drawing tank adapted to carry a bath of molten glass at a particular level, means for drawing a sheet upward from the bath and a refractory bar in the bath and extending transversely across the tank below said level of the path and the line of generation of the sheet, said bar decreasing in vertical cross section from its center portion to its end portions.

5. In combination in apparatus for drawing sheet glass, a glass drawing tank adapted to carry a bath of molten glass at a particular level, means for drawing a sheet upward from the bath and a refractory bar in the bath and extending transversely across the tank below said level of the bath and the line of generation of the sheet, said bar having sheet guiding means extending longitudinally of the bar and decreasing in vertical cross section from its center portion to its end portions.

6. In combination in apparatus for drawing sheet glass, a glass drawing tank adapted to carry a bath of molten glass at a particular level, means for drawing a sheet upward from the bath, a pair of shielding blocks lying on opposite sides of the sheet and having lateral flanges or ledges, and refractory shade means on the ledges free to be positioned with the edges thereof overhanging the edges of said lateral flanges.

In testimony whereof I have hereunto subscribed my name this 29th day of Jany., 1923.

HARRY G. SLINGLUFF.